United States Patent
Do et al.

(10) Patent No.: US 6,723,450 B2
(45) Date of Patent: Apr. 20, 2004

(54) MAGNETIC RECORDING MEDIUM WITH ANTIPARALLEL COUPLED FERROMAGNETIC FILMS AS THE RECORDING LAYER

(75) Inventors: Hoa Van Do, Fremont, CA (US); Mary F. Doerner, Santa Cruz, CA (US); Eric Edward Fullerton, Morgan Hill, CA (US); David Thomas Margulies, Gilroy, CA (US); William G. McChesney, San Jose, CA (US); Manfred Ernst Schabes, Campbell, CA (US); Kai Tang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 12 days.

(21) Appl. No.: 10/103,186

(22) Filed: Mar. 19, 2002

(65) Prior Publication Data

US 2003/0180577 A1 Sep. 25, 2003

(51) Int. Cl.⁷ .............................. G11B 5/66; G11B 5/673
(52) U.S. Cl. ..................... 428/611; 428/637; 428/667; 428/668; 428/669; 428/672; 428/673; 428/65.3; 428/215; 428/694 TM
(58) Field of Search .................................. 428/611, 636, 428/667, 668, 669, 672, 673, 65.3, 213, 215, 694 TM

(56) References Cited

U.S. PATENT DOCUMENTS

| | | |
|---|---|---|
| 4,789,598 A | 12/1988 | Howard et al. |
| 5,051,288 A | 9/1991 | Ahlert et al. |
| 5,062,938 A | 11/1991 | Howard |
| 5,066,552 A | 11/1991 | Howard et al. |
| 5,408,377 A | 4/1995 | Gurney et al. |
| 5,462,796 A | 10/1995 | Teng et al. |
| 5,465,185 A | 11/1995 | Heim et al. |
| 5,523,173 A | 6/1996 | Doerner et al. |
| 5,736,013 A | 4/1998 | Ranjan et al. |
| 6,166,948 A | 12/2000 | Parkin et al. |
| 6,280,813 B1 | 8/2001 | Carey et al. |
| 6,534,204 B1 * | 3/2003 | Akimoto et al. ..... 428/694 TM |

(List continued on next page.)

OTHER PUBLICATIONS

S. E. Lambert, et al., "Reduction of Media Noise in Thin Film Metal Media by Lamination", IEEE Transactions on Magnetics, vol. 26, No. 5, Sep. 1990, pp. 2706–2709.
E. S. Murdock, et al., "Noise Properties of Multilayered Co Alloy Magnetic Recording Media", IEEE Transactions on Magnetics, vol. 26, No. 5, Sep. 1990, pp. 2700–2705.
A. Murayama, et al., "Interlayer Exchange Coupling in Co/Cr/Co Double–Layered Recording Films Studied by Spin–Wave Brillouin Scattering", IEEE Transactions on Magnetics, vol. 27, No. 6, Nov. 1991, pp. 5064–5066.

(List continued on next page.)

Primary Examiner—Paul Thibodeau
Assistant Examiner—Kevin M. Bernatz
(74) Attorney, Agent, or Firm—Thomas R. Berthold

(57) ABSTRACT

A magnetic recording medium for data storage uses a magnetic recording layer having at least two ferromagnetic films with different remanent magnetization-thickness (Mrt) values that are coupled antiparallel across a nonferromagnetic spacer film predominantly by the dipole field ($H_d$) from the grains of the higher-Mrt ferromagnetic film. The material compositions and thicknesses of the ferromagnetic films and the nonferromagnetic spacer film are selected so that $H_d$ predominates over any antiferromagnetic exchange coupling field ($H_{af}$) and is greater than the coercive field of the lower-Mrt ferromagnetic film. As a result, the magnetizations of the two ferromagnetic films are antiparallel in the two remanent magnetic states, and thus the net remanent magnetization-thickness product (Mrt) of the recording layer is the difference in the Mrt values of the two ferromagnetic films.

20 Claims, 3 Drawing Sheets

U.S. PATENT DOCUMENTS

| | | | | |
|---|---|---|---|---|
| 2001/0044039 | A1 | * | 11/2001 | Suekane et al. ...... 428/694 TM |
| 2002/0098390 | A1 | * | 7/2002 | Do et al. ................ 428/694 TS |
| 2002/0114978 | A1 | * | 8/2002 | Chang et al. ......... 428/694 TM |
| 2002/0132140 | A1 | * | 9/2002 | Igarashi et al. ....... 428/694 TM |
| 2003/0017369 | A1 | * | 1/2003 | Hirayama et al. ... 428/694 TM |
| 2003/0082410 | A1 | * | 5/2003 | Sato et al. ............. 428/694 EC |

OTHER PUBLICATIONS

S. E. Lambert, et al., "Laminated Media Noise for High Density Recording", IEEE Transactions on Magnetics, vol. 29, No. 1, Jan. 1993, pp. 223–229.

E. Teng et al., "Flash Chromium Interlayer for High Performance Disks with Superior Noise and Coercivity Squareness", IEEE Transactions on Magnetics, vol. 29, No. 6, Nov. 1993, pp. 3679–3681.

Parkin et al. in "Oscillations in Exchange Coupling and Magnetoresistance in Metallic Superlattice Structures: Co/Ru, Co/Cr and Fe/Cr", Phys. Rev. Lett., vol. 64, pp. 2034–2037 (1990).

D. T. Margulies, et al., "Interlayer coupling and magnetic reversal of antiferromagnetically coupled media", Appl. Phys. Lett., vol. 80, No. 1, pp. 91–93, Jan. 7, 2002.

* cited by examiner

MAGNETIC RECORDING MEDIUM WITH ANTIPARALLEL COUPLED FERROMAGNETIC FILMS AS THE RECORDING LAYER

TECHNICAL FIELD

This invention relates generally to magnetic recording media, and more particularly to thermally stable high density media.

BACKGROUND OF THE INVENTION

Conventional media for horizontal or in-plane magnetic recording, such as the rigid magnetic recording disks in hard disk drives, typically use a granular ferromagnetic material, such as a sputter-deposited cobalt-platinum (CoPt) alloy, as the magnetic layer for the recording medium. Each magnetized domain in the magnetic layer is comprised of many small magnetic grains. The transitions between magnetized domains represent the "bits" of the recorded data. IBM's U.S. Pat. Nos. 4,789,598 and 5,523,173 describe this type of conventional rigid disk.

As the storage density of magnetic recording disks has increased, the product of the remanent magnetization Mr (the magnetic moment per unit volume of ferromagnetic material) and the magnetic layer thickness t has decreased. Similarly, the coercive field or coercivity ($H_c$) of the magnetic layer has increased. This has led to a decrease in the ratio $Mrt/H_c$. To achieve the reduction in Mrt, the thickness t of the magnetic layer can be reduced, but only to a limit because the layer will exhibit increasing magnetic decay, which has been attributed to thermal activation of small magnetic grains (the superparamagnetic effect). The thermal stability of a magnetic grain is to a large extent determined by $K_u V$, where $K_u$ is the magnetic anisotropy constant of the layer and V is the volume of the magnetic grain. As the layer thickness is decreased, V decreases. If the layer thickness is too thin, the stored magnetic information will no longer be stable at normal disk drive operating conditions. One approach to the solution of this problem is to move to a higher anisotropy material (higher $K_u$). However, the increase in $K_u$ is limited by the point where the coercivity $H_c$, which is approximately equal to $K_u/Mr$, becomes too great to be written by a conventional recording head. A similar approach is to reduce the Mr of the magnetic layer for a fixed layer thickness, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (SNR) of the magnetic layer.

Magnetic recording media with high intrinsic SNR (low intrinsic media noise) is desirable because it is well known in metal alloy media, such as CoPt alloys, that the intrinsic media noise increases with increasing linear recording density. Media noise arises from irregularities in the magnetic transitions and results in random shifts of the readback signal peaks. These random shifts are referred to as "peak jitter" or "time jitter". Thus higher media noise leads to higher bit error rates. It is therefore desirable to develop a thin film metal alloy magnetic media that generates noise below a maximum acceptable level so that data can be recorded at maximum linear density. It is known that substantially improved SNR can be achieved by replacing a single magnetic layer with a laminated magnetic layer of two (or more) separate magnetic layers that are spaced apart by an nonmagnetic spacer layer. This discovery was made by S. E. Lambert, et al., "Reduction of Media Noise in Thin Film Metal Media by Lamination", IEEE Transactions on Magnetics, Vol. 26, No. 5, September 1990, pp. 2706–2709, and subsequently patented in IBM's U.S. Pat. No. 5,051,288. The reduction in media noise by lamination is believed due to a decoupling of the magnetic interaction or exchange coupling between the magnetic layers in the laminate. The use of lamination for noise reduction has been extensively studied to find the favorable spacer layer materials, including Cr, CrV, Mo and Ru, and spacer layer thicknesses, from 5 to 400 A, that result in the best decoupling of the magnetic layers, and thus the lowest media noise. This work has been reported in papers by E. S. Murdock, et al., "Noise Properties of Multilayered Co-Alloy Magnetic Recording Media", IEEE Transactions on Magnetics, Vol. 26, No. 5, September 1990, pp. 2700–2705; A. Murayama, et al., "Interlayer Exchange Coupling in Co/Cr/Co Double-Layered Recording Films Studied by Spin-Wave Brillouin Scattering", IEEE Transactions on Magnetics, Vol. 27, No. 6, November 1991, pp. 5064–5066; and S. E. Lambert, et al., "Laminated Media Noise for High Density Recording", IEEE Transactions on Magnetics, Vol. 29, No. 1, January 1993, pp. 223–229. U.S. Pat. No. 5,462,796 and the related paper by E. Teng et al., "Flash Chromium Interlayer for High Performance Disks with Superior Noise and Coercivity Squareness", IEEE Transactions on Magnetics, Vol. 29, No. 6, November 1993, pp. 3679–3681, describe a laminated low-noise disk that uses a discontinuous Cr film that is thick enough to reduce the exchange coupling between the two magnetic layers in the laminate but is so thin that the two magnetic layers are not physically separated. However, in conventional laminated media, because the spaced-apart magnetic layers have their magnetic moments oriented parallel in the two remanent magnetic states (zero applied magnetic field), the Mrt of the laminated media is the sum of the Mrt of each of the individual magnetic layers and thus there is no reduction in Mrt and no improvement in thermal stability.

IBM's U.S. Pat. No. 6,280,813 describes antiferromagnetically coupled (AFC) media, wherein the magnetic recording layer is at least two ferromagnetic films exchange coupled together antiferromagnetically across a nonferromagnetic spacer film (also called the antiferromagnetic coupling film). The antiferromagnetic exchange coupling, which is believed to originate from the Ruderman-Kittel-Kasuya-Yoshida (RKKY) coupling typically found in Co/Ru/Co multilayers, produces an exchange field ($H_{af}$) that is greater than the coercive field of the lower ferromagnetic film. As a result the two ferromagnetic films have their moments oriented antiparallel in the two remanent magnetic states (zero applied magnetic field). Because the magnetic moments are oriented antiparallel, the net remanent magnetization-thickness product (Mrt) of the recording layer is the difference in the Mrt values of the two ferromagnetic films. This reduction in Mrt is accomplished without a reduction in the thermal stability of the recording medium because the volumes of the grains in the top ferromagnetic film remain unchanged since its thickness is unchanged. The exchange coupling oscillates from antiferromagnetic to ferromagnetic with decreasing coupling strength as the thickness of the spacer film increases, as described by Parkin et al. in "Oscillations in Exchange Coupling and Magnetoresistance in Metallic Superlattice Structures: Co/Ru, Co/Cr and Fe/Cr", Phys. Rev. Lett., Vol. 64, p. 2034 (1990).

Antiferromagnetic exchange coupling of ferromagnetic films was previously described with respect to spin-valve type giant magnetoresistance (GMR) recording heads and magnetic tunnel junction (MTJ) devices as a way to design continuous magnetized antiferromagnetically exchange coupled films whose magnetic moments are rigidly coupled together antiparallel during operation. These types of structures are described, for example, in IBM's U.S. Pat. Nos. 5,408,377 and 5,465,185. IBM's U.S. Pat. No. 6,166,948 describes an MTJ device with a continuous magnetized antiparallel-coupled ferromagnetic structure wherein antiferromagnetic exchange coupling is deliberately avoided. Instead, the two ferromagnetic films making up the structure are magnetostatically coupled at their ends by the dipole fields that emanate from the ends of the films.

In AFC media the antiferromagnetic coupling film must be selected from a list of known materials and must be of a special thickness to give rise to the exchange coupling between the two ferromagnetic films, which limits the material selection and manufacturing options in the design of the media structure.

What is needed is magnetic recording media that will support very high density recording while retaining good thermal stability and SNR and providing more options in material selection and manufacturing.

SUMMARY OF THE INVENTION

The invention is an antiparallel-coupled (APC) medium for horizontal magnetic recording wherein the magnetic recording layer comprises two ferromagnetic films with different Mrt values that are coupled antiparallel predominantly by dipole fields across a nonferromagnetic spacer film. The material compositions and thicknesses of the ferromagnetic films and the nonferromagnetic spacer film are selected so that the dipole field ($H_d$) from the grains of the higher-Mrt ferromagnetic film predominates over any antiferromagnetic exchange field ($H_{af}$) and is greater than the coercive field of the lower-Mrt ferromagnetic film. As a result, the magnetizations of the two ferromagnetic films will be antiparallel in the two remanent magnetic states. The net magnetic moment of the recording layer has two possible orientations, resulting in the two stable remanent magnetic states. In the APC medium, the net remanent magnetization-thickness product (Mrt) of the recording layer is reduced because it is the difference in the Mrt values of the two ferromagnetic films, and this reduction in Mrt is accomplished without a reduction in the thermal stability of the recording medium because the volumes of the grains in the higher-Mrt ferromagnetic film remain unchanged because the thickness is unchanged.

The spacer film in the APC medium can be a material that is not known to cause any substantial antiferromagnetic exchange coupling, in which case the thickness of the spacer film is less critical and can even be made very thin. The spacer film can also be a material that is known to cause antiferromagnetic exchange coupling, such as Ru or Cr, but can be made thick enough to avoid oscillatory coupling peaks so that any substantial antiferromagnetic exchange coupling is prevented and dipole coupling predominates. In one embodiment of the APC medium, a 6 Å RuCr spacer film results in a dipole field twice as large as the antiferromagnetic exchange coupling field.

For a fuller understanding of the nature and advantages of the present invention, reference should be made to the following detailed description taken together with the accompanying figures.

DETAILED DESCRIPTION OF THE INVENTION

Figure 1:
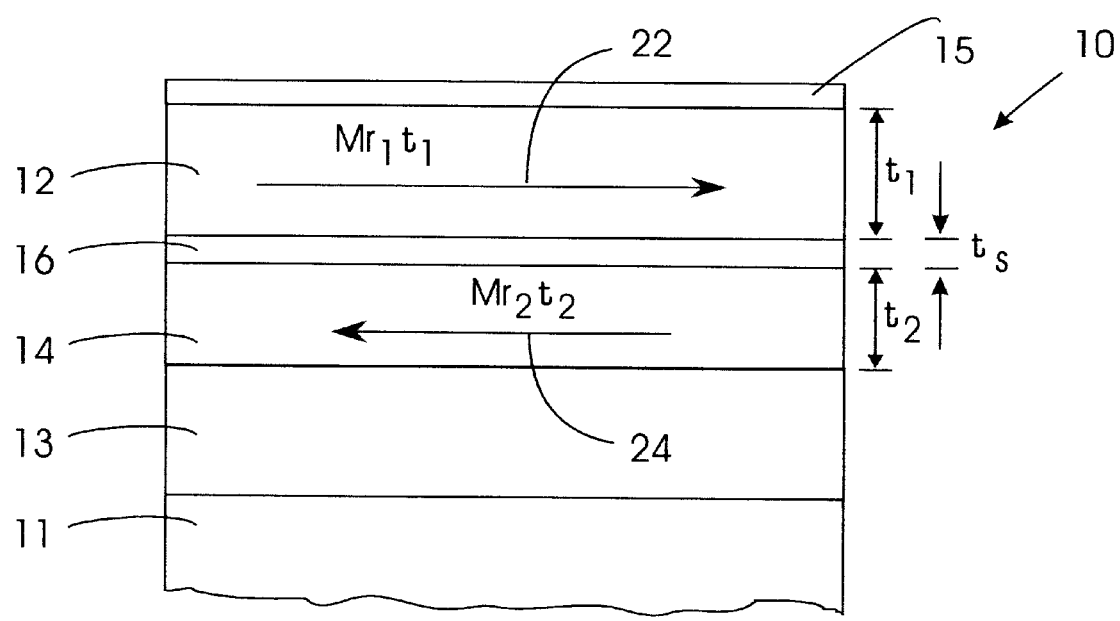
FIG. 1 is a schematic sectional view of the antiparallel (AP) coupled magnetic recording layer in a recording medium according to the present invention illustrating the substrate, underlayer, the films in the AP-coupled layer, and the protective overcoat.

The magnetic recording medium of the present invention has a recording layer formed of two or more ferromagnetic films that are coupled antiparallel (AP) to their neighboring ferromagnetic films by one or more nonferromagnetic spacer films. The material composition and thickness of the spacer films are selected to so that dipole fields from the grains of the higher-Mrt ferromagnetic film are greater than the coercive field from the lower-Mrt. ferromagnetic film, and favor the antiparallel alignment of the film magnetizations. The medium is shown schematically in FIG. 1 for a disk 10 having a recording layer made up of two ferromagnetic films 12, 14 separated by a nonferromagnetic spacer film 16. The nonferromagnetic spacer film 16 thickness and composition are chosen so that the magnetic moments 22, 24 of adjacent films 12, 14, respectively, are AP-coupled by dipole fields through the nonferromagnetic spacer film 16 and are antiparallel in zero applied fields (the two remanent magnetic states). The disk 10 is fabricated using conventional sputter deposition equipment and processes and includes a conventional substrate 11, such as glass or a AlMg disk blank with a nickel-phosphorous (NiP) surface coating, an underlayer 13 which is typically Cr or a multilayer structure such as $Cr_{50}Ti_{50}/Ru_{50}Al_{50}/Cr_{90}Ti_{10}$, and a protective overcoat 15 which is typically hydrogenated and/or nitrogenated amorphous diamond-like carbon.

The disk 10 uses conventional Co alloy longitudinal recording materials, such as CoPtCrB, for the ferromagnetic films 12, 14. If the ferromagnetic films are formed of the same material, such as CoPtCrB with the same alloy composition, then the upper film 12 is made thicker than the lower film 14 (e.g., 12 nm vs. 3 nm). As with single-layer media, it is advantageous to use a granular ferromagnetic material, such as a CoCrPtX alloy, that has isolated magnetic grains, to lower the media noise. The nonferromagnetic spacer film 16 is formed of a material and with a thickness so that the dipole coupling originating from the grain boundaries of the ferromagnetic films 12, 14 predominates over any antiferromagnetic exchange coupling.

As shown in FIG. 1, the films 12, 14 have remanent magnetization-thickness values of $Mr_1 t_1$ and $Mr_2 t_2$, respectively. (Because the remanent magnetization Mr is expressed as the magnetic moment per unit volume of ferromagnetic material, the product Mrt is the magnetic moment per unit area for a magnetic layer of thickness t.) For this AP-coupled structure the orientations of the magnetic moments 22, 24 of adjacent films 12, 14, respectively, are aligned antiparallel and thus add destructively to reduce the magnetic moment of the composite recording layer. The arrows 22, 24 represent the moment orientations of individual magnetic domains that are directly above and below one another across the spacer film 16. In the absence of an applied magnetic field, when the ferromagnetic film 14 is deposited onto the medium substrate, it will have a granular structure with the moments of the grains essentially randomly oriented. The spacer film is then deposited to the correct thickness on ferromagnetic film 14. Next, the second ferromagnetic film 12 is deposited on the spacer film 16. As the grains of ferromagnetic film 12 grow their moments will be antiparallel to the moment orientations of the grains of ferromagnetic film 14 that are directly across the spacer film 16.

The type of ferromagnetic material and the thickness values $t_1$, $t_2$ of the ferromagnetic films 12, 14 are chosen so that the net moment in zero applied field will be low, but nonzero. For the case shown in FIG. 1, the Mrt for the structure is given by $Mr_1$ $t_1$-$Mr_2$ $t_2$. In the preferred embodiment, $Mr_1$ $t_1$ should be >$Mr_2$ $t_2$. This may be accomplished by using the same ferromagnetic materials in the two films 12, 14 and having $t_1$ be greater than $t_2$, or the magnetization Mr (the magnetic moment per unit volume of material) of the two ferromagnetic films may be made different by using different ferromagnetic materials for the two films. While FIG. 1 is shown for a two-film structure with a single spacer film 16, the invention is extendible to structures with multiple spacer films and multiple ferromagnetic films.

Figure 2:
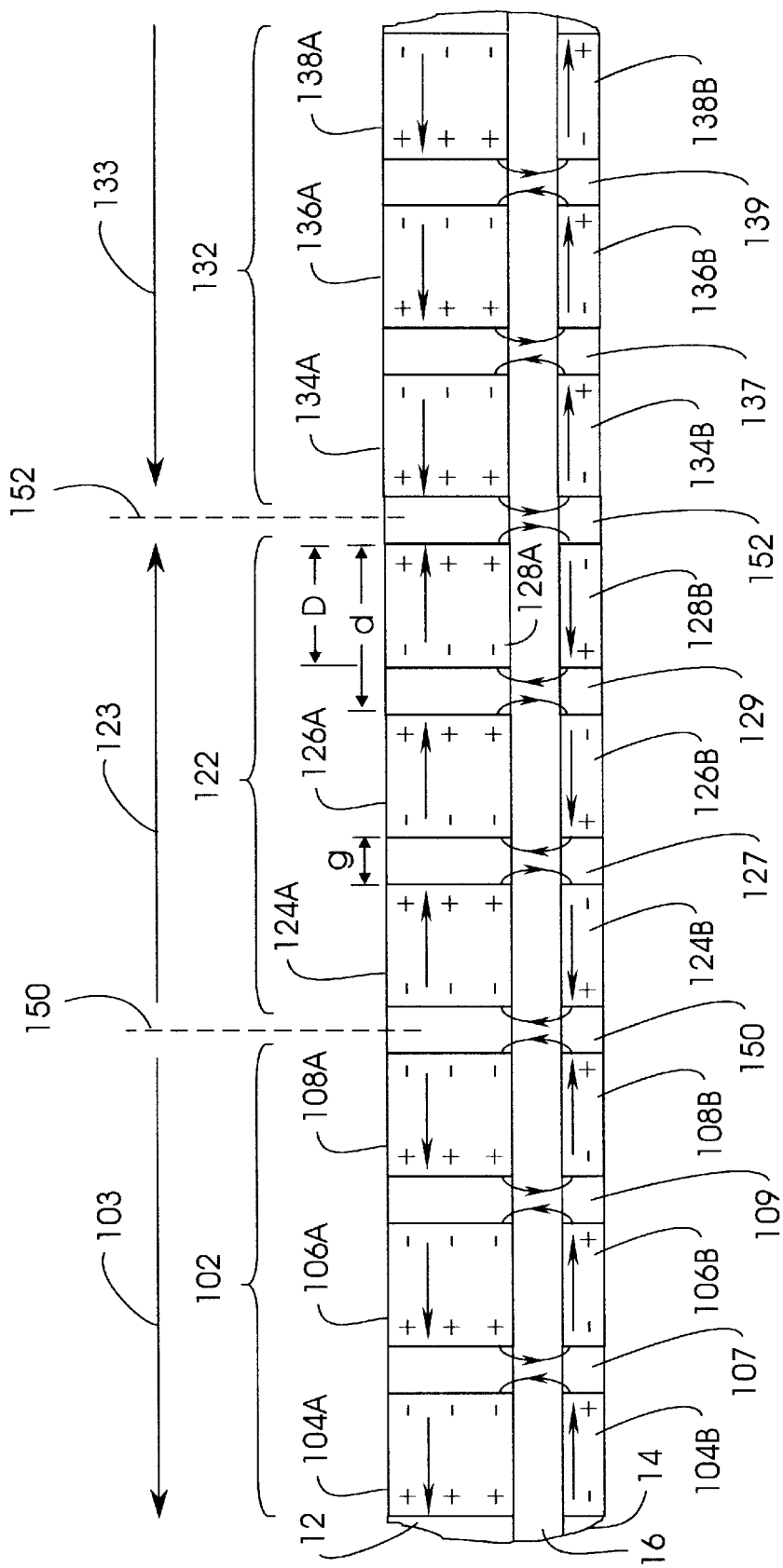
FIG. 2 is a schematic illustration of the AP-coupled layer illustrating multiple grains in a magnetic "bit", the dipole fields that couple the grains in the upper and lower ferromagnetic films, and the orientations of the moments of the ferromagnetic films at recorded magnetic transitions.

The manner in which the antiparallel moment alignment of films 12, 14 is caused primarily by grain boundary originated dipole fields can be understood by the schematic illustration of FIG. 2. The dipole-coupled recording layer of ferromagnetic films 12, 14 separated by spacer film 16 is shown for three separate magnetic "bits" 102, 122 and 132. Each bit comprises three magnetic grains 104A–B, 106A–B, 108A–B; 124A–B, 126A–B, 128A–B; and 134A–B, 136A–B, 138A–B, respectively. The grains are separated by nonferromagnetic grain boundaries 107, 109 in bit 102; 127, 129 in bit 122; and 137, 139 in bit 132. The direction of magnetization in the grains is shown by the horizontal arrows, with the net moment of each bit 102, 122, 132 being shown by arrows 103, 123, 133, respectively. The bits are separated from each other by grain boundaries 150, 152 that are also located at the transitions between the bits where the magnetization directions change. The grain boundaries in granular Co alloy films, such as CoPtCrB films, are essentially nonferromagnetic because of the nonferromagnetic materials, primarily boron and to a lesser extent Cr, which tend to segregate at the grain boundaries. Boron and other known segregants, such as Ta, Ag and Au, can be added to the Co alloy magnetic layer to reduce the magnetic exchange between the grains and thus reduce the intrinsic media noise. Other materials, such as oxides and nitrides, are also known as segregants that tend to concentrate in the grain boundaries and may be added to reduce the intrinsic media noise. For example, IBM's U.S. Pat. No. 5,066,552 teaches introducing oxygen into the argon during the sputter deposition of the Co alloy magnetic layer; IBM's U.S. Pat. No. 5,062,938 teaches the addition of an "impurity" element such as yttrium (Y), silicon (Si), the rare earth elements, hafnium (Hf), germanium (Ge), tin (Sn) and zirconium (Zr) by co-sputtering the Co alloy material and the impurity element(s) and thereafter oxidizing the impurity element(s); and U.S. Pat. No. 5,736,013 assigned to Komag teaches adding oxides or nitrides to the Co alloy magnetic layer by introduction from the sputtering target from which the magnetic layer materials come or from a separate sputtering target, with examples of such oxides and nitrides being CoO, $Co_2O_3$, $Co_3O_4$, $CrO_2$, $Cr_2O_3$, $TiO_2$, $Ta_2O_5$, $Al_2O_3$, WO, CoN, $Co_2N$, TiN, TaN, CrN and NiN.

As shown in FIG. 2, the Co alloys in both ferromagnetic films 12, 14 grow in a columnar microstructure and segregate into grains with nonferromagnetic grain boundaries, with the films growing coherently across the spacer film 16. The grains in the upper film 14, such as grains 104A, 106A and 108A, are located above the corresponding grains in the lower film 12, i.e., grains 104B, 106B and 108B. The segregation of the grains in this manner results in dipole fields that originate in the grain boundaries and couple the films 12, 14 together across the spacer film 16, as shown by the curved arrows in FIG. 2. By proper selection of film materials and thicknesses these dipole fields alone can exceed the coercive field of the lower film 14 and cause the antiparallel moment alignment shown in FIG. 2.

Since antiferromagnetic exchange coupling is not required in the present invention, there is a much wider set of materials that can be used for the spacer film. Also, unlike antiferromagnetic coupling layers used in antiferromagnetic exchange coupled structures, the thickness of the spacer film does not need to be extremely thin, nor as precise. This flexibility in spacer film selection is very useful for improving recording properties and manufacturability of the disk structure, as well as reducing cost.

The material for spacer film 16 may be chosen for its suitability as an underlayer or seed layer for the growth of film 12. The magnetic properties of film 12, in particular, its coercivity, will depend on its structure which, in turn, will be influenced by the layer on which it is grown. Suitable seed layer materials will depend on the ferromagnetic material from which layer 12 is formed. For example, suitable seed layers for ferromagnetic films of Co alloys are nonferromagnetic elemental layers such as Mo, Nb, Re, W, Ti, Zr, Hf, Cu, Cr, Ru, Rh, Pt, and Pd, and their alloys. Other suitable seed layers usable as the spacer film include nonferromagnetic binary alloys such as CrMo, RuCr, CrTi, $Cu_{100-x}Ni_x$ (x<50) and NiCr, or nonferromagnetic ternary alloys such as NiFeCr. In particular, in the present invention a seed layer of $Ru_xCr_{100-x}$, where 25<x<75, has been shown to provide excellent magnetic properties in a $Co_{62}Pt_{12}Cr_{18}B_8$ ferromagnetic film.

In addition, insulating materials, such as oxides and nitrides, can be used for the spacer film. It may also be desirable to form the spacer film of the same material that is used for the segregants in the Co alloy ferromagnetic films. While certain of the materials usable for the spacer film, such as Cr and especially Ru, are known as good materials for inducing antiferromagnetic exchange coupling when they are formed as very thin films to a relatively precise thickness, they can still function as spacer films to permit substantial dipole coupling while preventing any substantial antiferromagnetic exchange coupling if they are thick enough. Certain materials are known to prevent any substantial antiferromagnetic exchange coupling even when formed as very thin films, so these types of materials can be used over a much wider range of spacer film thicknesses. These materials include Re, insulating oxides such as $SiO_2$, and cobalt oxides such as CoO.

The present invention has a number of advantages over a magnetic recording layer formed as a single layer of ferromagnetic material. Low remanent magnetization can be obtained without using ultra-thin magnetic layers or low-magnetization alloys. This avoids the problems of thermal instability and difficulty in writing discussed above. If the AP-coupled magnetic layer in FIG. 1 is compared to a single-layer consisting of only film 12, for example, the addition of the AP-coupled ferromagnetic film 14 reduces the net Mrt of the composite structure without decreasing either the thickness or the magnetization of film 12.

Figure 3:
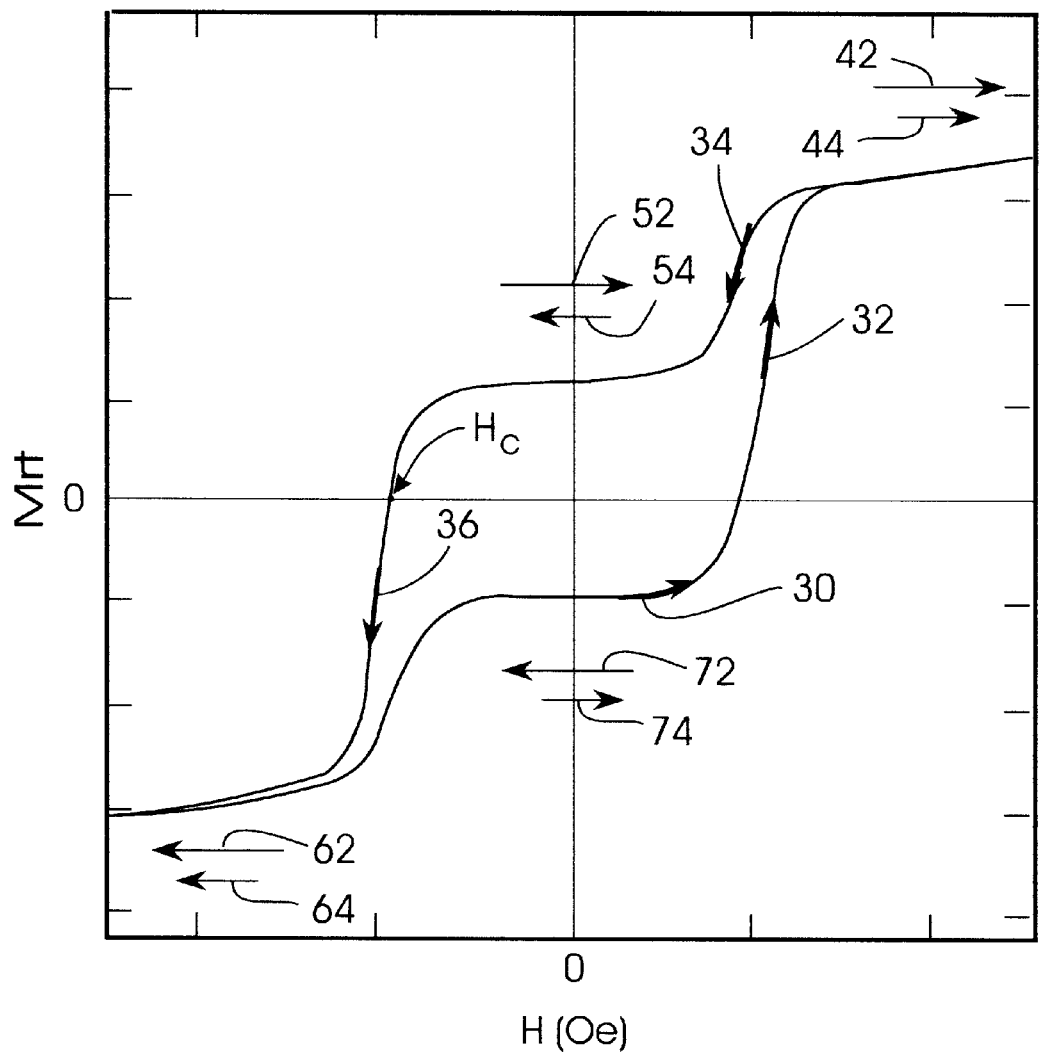
FIG. 3 is a schematic of a magnetic hysteresis loop for the structure with the AP-coupled layer of FIG. 1.

FIG. 3 is a schematic of the major hysteresis loop of the AP-coupled magnetic layer to illustrate its behavior in the presence of an applied magnetic field during writing and its two remanent magnetic states in the absence of an applied magnetic field. The pairs of horizontal arrows indicate the orientation of the ferromagnetic films in the AP-coupled layer at different points in the hysteresis loop. The applied field is increased in the positive direction (arrows 30, 32). For a large applied positive field from the write head, the dipole coupling is overcome and the moments of the two ferromagnetic films are both parallel to the applied field (arrows 42, 44). As the applied field is reduced when the write field is removed (arrow 34), the moment of the thinner bottom ferromagnetic film reverses and becomes antiparallel to the moment of the thicker top ferromagnetic film (arrows 52, 54) and to the applied field with a drop in the net moment. This switch occurs roughly at the dipole field felt by the bottom film arising from the grains in the top ferromagnetic film across the spacer film. For an antiparallel alignment of the moments of the ferromagnetic films to be realized requires that the dipole field ($H_d$) exceed the coercive field required to reverse the bottom ferromagnetic film ($H_{c2}$). $H_{c2}$ is the coercive field of the bottom film, assuming no dipole field interaction with the top ferromagnetic film. Thus, the magnetic properties and thickness of the bottom film, as well as the spacer film, must be designed to maintain $H_d > H_{c2}$. In addition, since the dipole field is the predominant field acting on the bottom ferromagnetic film, which allows the wider selection of spacer film materials and thicknesses, $H_d$ must be greater than $H_{af}$, the antiferromagnetic exchange field acting across the spacer film.

The remanent state after saturation in a positive write field is given by the moment of the top ferromagnetic film parallel to the field direction and the moment of the bottom ferromagnetic film antiparallel to the positive field direction (arrows 52, 54). In a reverse applied field (arrow 36) from the write head, the magnetic state is stable until the moment of the top ferromagnetic film reverses and the moments of both films are parallel and aligned in the negative saturation state (arrows 62, 64). The switching of the moment of the top ferromagnetic film determines the coercive field of the AP-coupled layer and is given by $H_c = K_u/Mr$. The properties of the top ferromagnetic film and the spacer film must be designed to maintain $H_c$ of the composite structure below the expected write field of the head. For this example the pathway to go from one remanent state (arrows 52, 54) to the next remanent state (arrows 72, 74) goes through an intermediate state where the moments of the two films are parallel (arrows 62, 64). The hysteresis loop of FIG. 3 exhibits the desired feature of the AP-coupled layer, i.e., a low remanent magnetization relative to the saturation magnetization.

As stated previously, the dipole coupling field between the two ferromagnetic films in the APC layer must be strong enough to overcome the coercivity of the bottom film so that the moments of the two ferromagnetic films will be antiparallel in the two remanent magnetic states. A technique for calculating both the dipole field and the RKKY coupling field for APC media is described by D. T. Margulies, et al., "Interlayer coupling and magnetic reversal of antiferromagnetically coupled media", *Appl. Phys. Lett.*, Vol. 80, No. 1, pp. 91–93, Jan. 7, 2002. The dipole field $H_d$ can be approximately represented in the following manner:

The grain diameter D is given by D=d−g, where d is the average spacing between grain centers and g is the width of the grain boundary, as depicted in FIG. 2. The dipole field $H_d$ generated by the top ferromagnetic film and acting on the bottom ferromagnetic film can be computed from the magnetostatic surface charges that are generated at the crystalline facets of the top grains in the top ferromagnetic film. The representation is $H_d = H_0 \exp(-t_s/t_0)$, where $H_0$ and $t_0$ are constants depending on $Mr_1$, $t_1$, g, and D, and $t_s$ is the thickness of the spacer film. In one calculation, a sum of the fields of 25,000 top film grains with square cross section, and d=10 nm, g=3 nm, and $Mr_1$=350 emu/cc, resulted in values for the constants $H_0$ and $t_0$ to be $H_0$=284 Oe and $t_0$=1.5 nm. Larger coupling fields are obtained for g=4 nm, which increases to 520 Oe. Even larger field values can be obtained by increasing the moment density of the top film grains, which directly scales the magnitude of the dipole coupling field. Thus the parameters $M_1t_1$, $t_1$, $t_s$, g, and D should be chosen so that $H_d > H_{c2}$.

The examples below give representative spacer film materials and thicknesses and calculated fields. In these examples the bottom ferromagnetic film was 30 Å $Co_{78}Cr_{22}$ and the top ferromagnetic film was 150 Å $Co_{62}Pt_{12}Cr_{18}B_8$.

EXAMPLE 1

Spacer film material: Ru
Spacer film thickness $t_s$: 12 Å
$H_d$=150 Oe
$H_{c2}$=0 kOe
$H_c$=4.0 kOe
$H_{af}$=0 Oe

EXAMPLE 2

Spacer film material: Re
Spacer film thickness $t_s$: 6 Å
$H_d$=240 Oe
$H_{c2}$=0 kOe
$H_c$=4.0 kOe
$H_{af}$=0 Oe

EXAMPLE 3

Spacer film material: CoO
Spacer film thickness $t_s$: 6 Å
$H_d$=240 Oe
$H_{c2}$=0 kOe
$H_c$=4.0 kOe
$H_{af}$=0 Oe

EXAMPLE 4

Spacer film material: $Ru_{57}Cr_{43}$
Spacer film thickness $t_s$: 6 Å
$H_d$=240 Oe
$H_{c2}$=0 kOe
$H_c$=4.0 kOe
$H_{af}$=120 Oe The above examples illustrate the advantages of the present invention. Example 1 illustrates that Ru, which would result in predominantly antiferromagnetic exchange coupling ($H_{af} >> H_d$) at 6 Å, results in substantially only dipole coupling at 12 Å. Examples 2 and 3 illustrate that certain spacer film materials (e.g., Re and CoO) can be at the same thickness (6 Å) where Ru would cause only antiferromagnetic exchange coupling, yet these materials will cause substantially only dipole coupling. Example 4 illustrates that $Ru_{57}Cr_{43}$ can be selected to function as a seed layer for the top ferromagnetic film and can be made the same thickness (6 Å) as Ru alone if Ru were to be an antiferromagnetic exchange coupling film, yet the $Ru_{57}Cr_{43}$ thickness does not need to be precisely controlled because the dipole coupling predominates over the RKKY coupling. Thus even as a very thin film (6 Å) RuCr can result in dipole coupling that is approximately twice as large as the antiferromagnetic exchange coupling, so that dipole coupling predominates and substantial antiferromagnetic exchange coupling is prevented.

Thus in the present invention if the spacer material is selected to be a material that does not result in any significant antiferromagnetic exchange coupling, and antiparallel alignment of the moments of the two ferromagnetic films is observed in the two remanent magnetic states, then dipole coupling can be assumed as the predominant cause of the antiparallel moment alignment in the APC medium.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetic recording medium comprising:
   a substrate;
   an underlayer on the substrate; and
   a magnetic recording layer comprising a lower granular cobalt alloy ferromagnetic film on the underlayer and having its magnetic moment oriented in a first direction, nonferromagnetic spacer film located on and in contact with the lower ferromagnetic film, and an upper granular cobalt alloy ferromagnetic film located on and in contact with the spacer film and having its magnetic moment oriented in a second direction substantially antiparallel to said first direction, the magnetic moment per unit area of the upper ferromagnetic film being greater than the magnetic moment per unit area of the lower ferromagnetic film and the lower ferromagnetic film being coupled to the upper ferromagnetic film predominantly by dipole fields across the spacer film, and wherein the lower ferromagnetic film is the one and only one ferromagnetic film between the spacer film and the substrate, whereby the recording layer has a net magnetic moment oriented substantially in one of said first and second directions in the absence of an applied magnetic field.

2. The medium of claim 1 wherein the upper ferromagnetic film has a thickness t1 and a magnetization M1, the lower ferromagnetic film has a thickness t2 and a magnetization M2, the upper and lower ferromagnetic films are formed of the same material, and t1 is greater than t2.

3. The medium of claim 1 further comprising a protective overcoat formed over the magnetic recording layer.

4. The medium of claim 1 wherein the spacer film is formed of a material that prevents any substantial antiferromagnetic exchange coupling between the upper and lower ferromagnetic films.

5. The medium of claim 1 wherein the spacer film is formed of a material selected from the group consisting of B, Ta, Ag and Au.

6. The medium of claim 1 wherein the spacer film is formed of an oxide of one or more of Y, Si, Hf, Ge, Sn, Zr, Cr, Co, Ti, Ta, Al and W.

7. The medium of claim 1 wherein the spacer film is formed of a nitride of one or more of Cr, Co, Ti, Ta and Ni.

8. The medium of claim 1 wherein the spacer film is formed of a material selected from the group consisting of Mo, Nb, Re, W, Ti, Zr, Hf, Cu, Cr, Ru, Rh, Pt, Pd, and alloys of one or more of Mo, Nb, Re, W, Ti, Zr, Hf, Cu, Cr, Ru, Rh, Pt, and Pd.

9. The medium of claim 1 wherein the spacer film is formed of a material selected from the group consisting of nonferromagnetic binary alloys of CrMo, RuCr, CrTi, $Cu_{100-x}Ni_x$ (x<50) and NiCr, and the nonferromagnetic ternary alloy of NiFeCr.

10. The medium of claim 9 wherein the spacer film is formed of $Ru_xCr_{100-x}$, where 25<x<75.

11. The medium of claim 1 wherein the spacer film is formed of a material that is also present in the upper ferromagnetic film.

12. A magnetic recording disk comprising:
   a substrate; and
   a magnetic recording layer comprising a granular cobalt alloy lower ferromagnetic film on the substrate, a nonferromagnetic spacer film on the lower ferromagnetic film, and a granular cobalt alloy upper ferromagnetic film on the spacer film, the magnetic moment per unit area of the upper ferromagnetic film being greater than the magnetic moment per unit area of the lower ferromagnetic film and the dipole field from the upper ferromagnetic film across the spacer film being greater than the coercive field of the lower ferromagnetic film, whereby the magnetic moments of the lower and upper ferromagnetic films are oriented substantially antiparallel in the absence of an applied magnetic field, and wherein the spacer film is formed of a material selected from the group consisting of B, Ta, Ag, Au, an oxide of one or more of Y, Si, Hf, Ge, Sn, Zr, Cr, Co, Ti, Ta, Al and W, a nitride of one or more of Cr, Co, Ti, Ta and Ni, the nonferromagnetic binary alloys of CrMo, RuCr, CrTi, $Cu_{100-x}Ni_x$ (x<50) and NiCr, and the nonferromagnetic ternary alloy of NiFeCr.

13. The disk of claim 12 further comprising an underlayer located on the substrate between the substrate and the lower ferromagnetic film.

14. The disk of claim 12 further comprising a protective overcoat formed over the magnetic recording layer.

15. The disk of claim 12 wherein the spacer film is formed of $Ru_xCr_{100-x}$, where 25<x<75, and the upper ferromagnetic film is a CoPtCrB alloy film formed directly on and in contact with the spacer film.

16. The disk of claim 12 wherein the spacer film is formed of a material that is also present in the upper ferromagnetic film.

17. A magnetic recording disk comprising:
   a substrate; and
   a magnetic recording layer comprising a granular cobalt alloy lower ferromagnetic film on the substrate, a nonferromagnetic spacer film on the lower ferromagnetic film, and a granular cobalt alloy upper ferromagnetic film on the spacer film, and;
   wherein the magnetic moment per unit area of the upper ferromagnetic film is greater than the magnetic moment per unit area of the lower ferromagnetic film, the magnetic moments of the lower and upper ferromagnetic films are oriented substantially antiparallel in the absence of an applied magnetic field, and the spacer film is formed of a material that prevents any substantial antiferromagnetic exchange coupling between the lower and upper ferromagnetic films, the spacer film being formed of a material selected from the group consisting of an oxide of one or more of Y, Si, Hf, Ge, Sn, Zr, Cr, Co, Ti, Ta, Al and W, a nitride of one or more of Cr, Co, Ti, Ta and Ni, the nonferromagnetic binary alloys of CrMo, RuCr, CrTi, $Cu_{100-x}Ni_x$ (x<50) and NiCr, and the nonferromagnetic ternary alloy of NiFeCr.

18. The disk of claim 17 further comprising an underlayer located on the substrate between the substrate and the lower ferromagnetic film.

19. The disk of claim 17 further comprising a protective overcoat formed over the magnetic recording layer.

20. The disk of claim 17 wherein the spacer film is formed of a material that is also present in the upper ferromagnetic film.

* * * * *